O. ANDERSON.
METHOD OF MECHANICAL MILKING.
APPLICATION FILED MAR. 21, 1914.
1,113,943.
Patented Oct. 20, 1914.
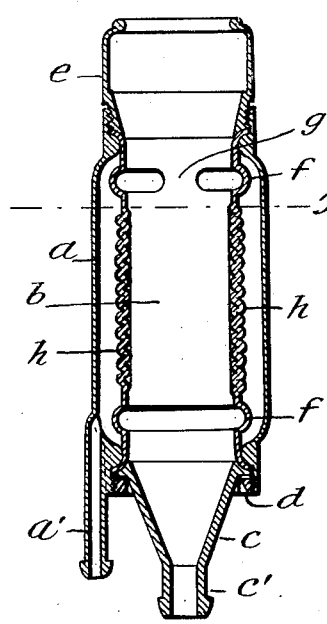
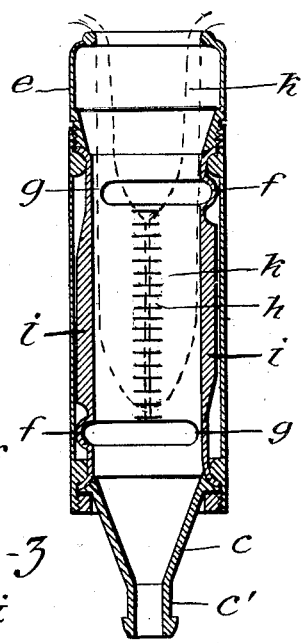
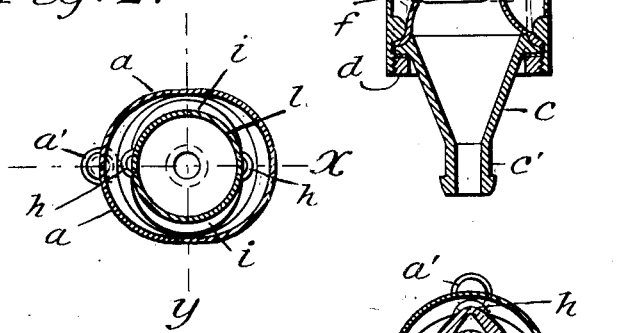
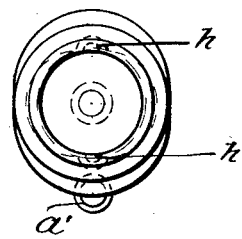
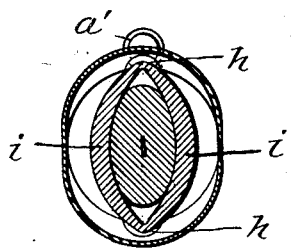
WITNESSES:
C. Arnold Hult
Ellen M. Hult
INVENTOR
Oscar Anderson.

UNITED STATES PATENT OFFICE.

OSCAR ANDERSON, OF KEARNEY, NEW JERSEY.

METHOD OF MECHANICAL MILKING.

1,113,943.  Specification of Letters Patent.  Patented Oct. 20, 1914.

Application filed March 21, 1914. Serial No. 826,183.

*To all whom it may concern:*

Be it known that I, OSCAR ANDERSON, a citizen of the United States, residing at Kearney, in the county of Hudson, State of New Jersey, have invented a certain Method of Mechanical Milking, of which the following is a specification.

My method of milking set forth in this specification consists of subjecting the teats to a partial vacuum or suction, and to intermittent squeezing of the lower or muscular part, and at the same time creating a longitudinal back and forth rubbing movement over the teat, either on one side only or on two sides in opposite directions, but in leaving part near the udder (the milk cistern) free from any squeezing or pressure whatsoever.

The teats, particularly on cows, can be said to consist of two parts, the upper and lower. The lower or muscular part contains the milk passage with the milk retaining muscles. The upper part has a cavity or chamber which extends up in the udder and is commonly termed, "milk cistern."

In studying the action of a suckling calf we find that besides sucking he also squeezes the teat with his tongue and at the same time rubs it lengthwise back and forth under the teat while the other side is held steady against the roof of the mouth. This manipulation is only on the lower or muscular part of the teat. It is therefore evident that with the right kind of manipulation the teat will stand the necessary amount of suction to draw the milk without injury or without being brought out of normal condition. Knowing the structure of the teat it will be plainly seen that squeezing the upper part will, instead of drawing the milk, force it back in the udder, which naturally will injure the cow in time.

The milking machines heretofore used either pulsating suction or squeezing alone or else suction and squeezing the whole length of the teat and sometimes the upper part only has been pressed, the result has been more or less injurious, resulting in congested teats and udder, shrinkage in milk and shortened periods of lactation.

The primary object of my invention is to cause a free passage of the milk from the teat without at any time bringing the teat out of normal condition or to cause any harmful movements of the milk in the udder or any undue strain or pressure thereof while the milking is in progress.

My method of milking is illustrated in accompanying drawing in which like numerals of reference indicate corresponding parts in each of the several figures.

Figure 1 is a vertical sectional view of a teat cup taken at line X Fig. 2. Fig. 2 is a cross section taken at line X Fig. 1. Fig. 3 is a sectional view taken at right angle to that in Fig. 1 or at line Y Fig. 2. Fig. 4 is a sectional view illustrating the manipulation of the teat. Fig. 5 is a cross section taken at line Z Fig. 4. Fig. 6 is a top view of Fig. 3.

In Fig. 1 $a$, is a rigid outer shell of the teat cup; B is a flexible sleeve; C is a preferably transparent funnel shaped bottom, terminating in duct C', a threaded ring at D holding sleeve B and bottom C securely in shell A. A' is a hose nipple on shell A. At the top of shell A is a rigid extension E, forming a chamber or space around the teat and serving to prevent any squeezing or manipulation of the "milk cistern" part; the top is contracted and serves to form a tight joint with the teat. Sleeve B is cylindrical in its general outline; having two horizontal corrugations near the ends which do not extend all around the sleeve and in opposite direction to each other with reference to the axis of the sleeve as indicated in Figs. 1, 3 and 4 at F. G indicates the uncorrugated part. Sleeve B is also provided with two vertical rows of short horizontal corrugations H, dividing the sleeve in two parts I, and making said parts capable of moving in opposite directions as indicated in Fig. 4. When the sleeve has only one corrugation F, only one side will have the longitudinal movement, leaving the other side stationary with reference to that movement. The parts I, increase in thickness from corrugations H, toward the middle as shown in Figs. 2, 3, 4 and 5.

In Fig. 3 the dotted lines at K give a general outline of the structure of the teat, showing the muscular part with the milk passage and the upper part of the "milk cistern". In operating the machine, duct C' is by a hose connected to a milk receptacle which in turn is connected to some suction producing means. Duct A' is by a pulsator (not shown) connected alternately with suction and pressure.

In operation the teat is placed over the mouth piece C and suction applied through duct C'; the teat is then drawn into proper place in the cup; suction is at the same time applied through duct A'; the position of sleeve B, and the teat is shown in Fig. 3. When pressure is applied through duct A', sleeve B, collapses as shown in Figs. 4 and 5. It will be noticed in Fig. 5 that the teat is squeezed on two sides and two air passages left between. The collapsing sleeve B (in Fig. 4) has moved in two directions toward the center and lengthwise, corrugations F, in being flattened out by the pressure move parts I of the sleeve toward the opposite ends of the cup. The two positions are indicated in Fig. 4. When suction is again applied through A' the two movements of sleeve B are reversed so the rubbing is effected both ways along the teat. This action is regulated as desired but is generally repeated from 45 to 60 times per minute.

The combined squeezing and rubbing of the teat relaxes the retaining muscles, allowing a free passage of the milk and at the same time prevents any congestion or unnatural condition of the teat.

It will be noticed that the extension E of the cup not only guards the teat near the udder from being squeezed but has a space all around so as to allow free movement for the teat and prevent back flow of the milk to the udder, which is important.

Having described my invention I claim:

1. The method of milking, consisting in subjecting the teat to suction, squeezing and manipulation on the lower muscular part, while the upper hollow part is protected from being squeezed or manipulated.

2. The method of milking consisting in subjecting the teat to suction and to intermittent squeezing in such a manner as to create a longitudinal back and forth rubbing movement over the teat.

3. The method of milking consisting in subjecting the whole length of the teat to suction and the lower part to squeezing on two sides.

4. The method of milking consisting in subjecting the teat to suction and to intermittent squeezing over the lower part in such a manner as to simultaneously create a rubbing movement over said part and inclosing the upper or hollow part in a rigid casing forming an airspace around said upper part.

5. The method of milking consisting in subjecting the teat to suction over the whole length and to intermittent squeezing over the muscular part only in such a manner as to simultaneously create a light rubbing movement along said part and in providing a rigid air-chamber around the teat near the udder.

6. The method of milking consisting in subjecting the teat to suction and to intermittent squeezing of the lower or muscular part in such a manner as to create a rubbing movement along the teat on two sides in opposite direction.

7. The method of milking consisting in subjecting the teat to suction and intermittent squeezing over the lower or muscular part, the squeezing being done on two sides of the teat and air passages being simultaneously formed along the teat and in providing a rigid air chamber inclosing the part near to the udder.

8. The method of milking consisting in subjecting the teat to suction and to intermittent squeezing and providing a chamber around the "milk cistern" part of the teat in order to prevent any injurious disturbance of the milk in the udder while the muscular part of the teat is manipulated.

9. The method of milking, consisting in subjecting the teat to a back and forth rubbing movement on two sides and in opposite directions.

10. In pneumatic milking machines, the method of milking consisting in subjecting the teat to a rubbing movement lengthwise and in opposite directions.

OSCAR ANDERSON.

Witnesses:
R. R. BRADY,
H. B. KALLMYER.